(12) United States Patent
Haas et al.

(10) Patent No.: US 12,534,424 B2
(45) Date of Patent: *Jan. 27, 2026

(54) EXTRACTION OF ALIPHATIC ALCOHOLS

(71) Applicant: EVONIK OPERATIONS GMBH, Essen (DE)

(72) Inventors: Thomas Haas, Münster (DE); Christian Richter, Münster (DE)

(73) Assignee: Evonik Operations GmbH, Essen (DE)

( * ) Notice: Subject to any disclaimer, the term of this patent is extended or adjusted under 35 U.S.C. 154(b) by 773 days.

This patent is subject to a terminal disclaimer.

(21) Appl. No.: 17/630,435

(22) PCT Filed: Jul. 23, 2020

(86) PCT No.: PCT/EP2020/070765
§ 371 (c)(1),
(2) Date: Jan. 26, 2022

(87) PCT Pub. No.: WO2021/018715
PCT Pub. Date: Feb. 4, 2021

(65) Prior Publication Data
US 2022/0281789 A1 Sep. 8, 2022

(30) Foreign Application Priority Data

Jul. 29, 2019 (EP) .................... 19188881

(51) Int. Cl.
*C07C 29/86* (2006.01)
*C07C 31/125* (2006.01)
*C07F 9/53* (2006.01)
*C12P 7/04* (2006.01)

(52) U.S. Cl.
CPC ............ *C07C 29/86* (2013.01); *C07C 31/125* (2013.01); *C07F 9/5304* (2013.01); *C12P 7/04* (2013.01)

(58) Field of Classification Search
None
See application file for complete search history.

(56) References Cited

U.S. PATENT DOCUMENTS

| | | | |
|---|---|---|---|
| 4,153,809 A | 5/1979 | Suzuki | |
| 4,544,779 A * | 10/1985 | Bright | ............... C07C 29/86 568/918 |
| 4,705,894 A | 11/1987 | Su et al. | |
| 4,714,791 A | 12/1987 | Inada et al. | |
| 5,175,357 A | 12/1992 | Van Brunt | |
| 7,122,709 B2 | 10/2006 | Fanselow et al. | |
| 8,703,843 B2 | 4/2014 | Atkinson et al. | |
| 10,053,411 B2 | 8/2018 | Dishisha et al. | |
| 10,144,904 B2 | 12/2018 | Wiesmueller et al. | |
| 11,124,813 B2 | 9/2021 | Haas et al. | |
| 11,174,496 B2 | 11/2021 | Haas et al. | |
| 2003/0012715 A1 | 1/2003 | Bond et al. | |
| 2006/0096849 A1 | 5/2006 | Kerker et al. | |
| 2007/0275447 A1 | 11/2007 | Lewis et al. | |
| 2008/0057554 A1 | 3/2008 | Huhnke et al. | |
| 2008/0119668 A1 | 5/2008 | Nordhoff et al. | |
| 2010/0210871 A1 | 8/2010 | Kobler et al. | |
| 2013/0164797 A1 | 6/2013 | Gielen et al. | |
| 2014/0106421 A1 | 4/2014 | Yin et al. | |
| 2014/0303408 A1* | 10/2014 | Zaher | ............... C07C 29/86 568/913 |
| 2016/0215302 A1 | 7/2016 | Haas et al. | |
| 2017/0183696 A1 | 6/2017 | Nouaille et al. | |
| 2019/0169654 A1 | 6/2019 | Hecker et al. | |
| 2020/0377914 A1 | 12/2020 | Haas et al. | |
| 2022/0289773 A1 | 9/2022 | Haas et al. | |

FOREIGN PATENT DOCUMENTS

| | | |
|---|---|---|
| CN | 102875384 | 1/2013 |
| DE | 3626968 | 2/1988 |
| EP | 0 157 183 | 10/1985 |

(Continued)

OTHER PUBLICATIONS

Richter, H. et al. "A Narrow pH Range Supports Butanol, Hexanol, and Octanol Production from Syngas in a Continuous Co-culture of Clostridium ljungdahlii and Clostridium kluyveri with In-Line Product Extraction" Frontiers in Microbiology, Nov. 2016, vol. 7, Article 1773 (Year: 2016).*
Phillips, H. et al. "Butanol and hexanol production in Clostridium carboxidivorans syngas fermentation: Medium development and culture techniques" Bioresource Technology 190 (2015) 114-121 (Year: 2015).*
De Poures, M. V. et al. "1-Hexanol as a sustainable biofuel in DI diesel engines and its effect on combustion and emissions under the influence of injection timing and exhaust gas recirculation (EGR)" Applied Thermal Engineering 113 (2017) 1505-1513 (Year: 2017).*
International Search Report for corresponding PCT/EP2020/070765, filed Jul. 23, 2020.
Written Opinion of the International Searching Authority for corresponding PCT/EP2020/070765, filed Jul. 23, 2020.
International Preliminary Report on Patentability for corresponding PCT/EP2020/070765, filed Jul. 23, 2020.

(Continued)

*Primary Examiner* — Medhanit W Bahta
(74) *Attorney, Agent, or Firm* — Law Office of Michael A. Sanzo, LLC

(57) ABSTRACT

The present invention relates to a method of extracting an aliphatic alcohol, preferably containing 5 to 16 carbon atoms, from an aqueous medium, the method comprising:
(a) contacting the aliphatic alcohol in the aqueous medium with at least one extracting medium for a time sufficient to extract the aliphatic alcohol from the aqueous medium into the extracting medium,
(b) separating the extracting medium with the extracted aliphatic alcohol from the aqueous medium
wherein the extracting medium comprises:
at least one trialkyl-phosphine-oxide, preferably trioctyl-phosphine-oxide, and optionally at least one alkane, and
wherein the aliphatic alcohol is produced from a carbon source by contacting the carbon source with at least one microorganism capable of converting the carbon source to the aliphatic alcohol.

14 Claims, No Drawings

(56) References Cited

FOREIGN PATENT DOCUMENTS

| EP | 0 732 320 | 9/1995 |
|---|---|---|
| GB | 2191490 | 12/1987 |
| JP | S53121713 | 10/1978 |
| JP | 2007082490 | 4/2007 |
| RU | 2038840 | 7/1995 |
| WO | WO 84/04923 | 12/1984 |
| WO | WO 85/00805 | 2/1985 |
| WO | WO 98/00558 | 1/1998 |
| WO | WO 99/38834 | 8/1999 |
| WO | WO 00/68407 | 11/2000 |
| WO | WO 2009/059228 | 5/2009 |
| WO | WO 2019/002240 | 1/2019 |
| WO | WO 2020/104411 | 5/2020 |

OTHER PUBLICATIONS

European Search Report and Search Opinion for EP 19188881.7, filed Jul. 29, 2019, corresponding to PCT/EP2020/070765.
International Search Report for international application PCT/EP2020/070767, filed Jul. 23, 2020, corresponding to copending U.S. Appl. No. 17/630,353.
Written Opinion of the International Searching Authority for international application PCT/EP2020/070767, filed Jul. 23, 2020, corresponding to copending U.S. Appl. No. 17/630,353.
International Preliminary Report on Patentability for international application PCT/EP2020/070767, filed Jul. 23, 2020, corresponding to copending U.S. Appl. No. 17/630,353.
European Search Report and Search Opinion for EP 19188880.9 filed Jul. 29, 2019, corresponding to PCT/EP2020/070767.
Database XP-002796868 cited in the International Search Report for international application PCT/EP2020/070765 to accompany JP S53121713.
Gildemyn, et al., "Upgrading syngas fermentation effluent using *Clostridium kluyveri* in a continuous fermentation," *Biotechnol Biofuels* 10:83 pp. 1-15 (Mar. 2017).
Jeon, et al., "Production of medium-chain carboxylic acids by *Megasphaera* sp. MH with supplemental electron acceptors," *Biotechnol Biofuels* 9:129, pp. 1-9 (Jun. 2016).

Morinaga, et al., "The production of acetic acid from carbon dioxide and hydrogen by an anaerobic bacterium," *Journal of Biotechnology* 14(2): 187-194 (May 1990).
Naveira, et al., "H-B-E (hexanol-butanol-ehtanol) fermentation for the production of higher alcohols from syngas/waste gas," *Journal of Chemical Technology & Biotechnology* 92(4): (Apr. 2017).
Sakai, et al., "Ethanol production from $H_2$ and $CO_2$ by a newly isolated thermophilic bacterium, *Moorella* sp. HUC22-1," *Biotechnology Letters* 26(20):1607-1612 (Oct. 2004).
Schmidt, et al., "Production of Acetic Acid from Hydrogen and Carbon Dioxide by *Clostridium* Species ATCC 29797," *Chem Eng Commun* 45(1-6):61-73 (May 1986).
Weiben, et al., "Extraction Equilibria of Formic and Acetic Acids from Aqueous Solution by Phosphate-Containing Extractants," *J. Chem. Eng. Data* 46(6):1472-1475 (Nov. 2001).
U.S. Appl. No. 17/630,353, filed Jan. 26, 2022, Haas.
U.S. Appl. No. 16/969,853, filed Feb. 15, 2019, US-2020/0377914 A1, Dec. 3, 2020, Haas.
Watson, et al., "A Liquid Phosphine Oxide: Solvent Extraction of Phenol, Acetic Acid and Ethanol," *Solvent Extraction and Ion Exchange* 6(2):207-220 (1988).
Non Final Office Action mailed Dec. 17, 2024 for copending U.S. Appl. No. 17/630,353.
Amendment & Response to Non Final Office Action filed Mar. 5, 2025 for copending U.S. Appl. No. 17/630,353.
Final Office Action mailed May Jun. 2, 2025 for copending U.S. Appl. No. 17/630,353.
Martak, et al., "Toxicity of Organic Solvents Used In Situ in Microbial Fermentation," Biotechnology Techniques 9 (4):247-252 (Apr. 1995).
Nuchnio, et al., "Extractive Acidogenic Fermentation by a Supported Liquid Membrane," Ferment. Technol. 65 (6):699-702 (1987).
Von Frieling, et al., "Recovery of lactic acid from aqueous model solutions and fermentation broths," Process Biochemistry 34:685-696 (1999).
Amendment to Response to Final Office Action filed Aug. 24, 2025 for copending U.S. Appl. No. 17/630,353.
Request for Continued Examination to Accompany Amendment to Response to Final Office Action filed Aug. 24, 2025 for copending U.S. Appl. No. 17/630,353.
Office Action mailed May Oct. 29, 2025 for copending U.S. Appl. No. 17/630,353.

\* cited by examiner

EXTRACTION OF ALIPHATIC ALCOHOLS

CROSS REFERENCE TO RELATED APPLICATIONS

The present application is US national stage of international application PCT/EP2020/070765, which had an international filing date of Jul. 23, 2020 and which was published on Feb. 4, 2021. The PCT application claims priority to EP 19188881.7, filed on Jul. 29, 2019. The content of these prior filings is hereby incorporated by reference in its entirety.

FIELD OF THE INVENTION

The present invention relates to a method for extracting an aliphatic alcohol from an aqueous medium. In particular, the method uses at least one trialkyl-phosphine-oxide, and optionally at least one alkane.

BACKGROUND OF THE INVENTION

Aliphatic alcohols have several functions in the art. For example, they can be used in the production of polymers, pharmaceuticals, solvents, and food additives.

WO1985000805 a method for producing alcohol, comprising extracting an aqueous alcohol solution with an organic solvent system comprising an organic solvent U.S. Pat. No. 4,714,791 discloses a process for recovering primary normal aliphatic higher alcohols, which comprises contacting sugarcanes, or products obtained from the sugarcanes, as an extraction raw material with a fluid in a subcritical or supercritical state Accordingly, there is a need in the art for a cheaper and more efficient extraction method for extracting aliphatic alcohols, especially aliphatic alcohols produced in industrial scale.

Further, there is a need for an extraction method of aliphatic alcohols that can be used in connection with a biotechnological method of producing the aliphatic alcohols.

DESCRIPTION OF THE INVENTION

The present invention attempts to solve the problems above by providing a means of extracting aliphatic alcohols that is more efficient and cheaper than the current methods available in the art. The present invention also provides a means of extracting aliphatic alcohols that can be used in conjunction with a biotechnological method of producing aliphatic alcohols.

According to one aspect of the present invention, there is provided a method of extracting an aliphatic alcohol from an aqueous medium, the method comprising:
  (a) contacting the aliphatic alcohol in the aqueous medium with at least one extracting medium for a time sufficient to extract the aliphatic alcohol from the aqueous medium into the extracting medium,
  (b) separating the extracting medium with the extracted aliphatic alcohols from the aqueous medium
  wherein the extracting medium comprises:
    at least one trialkyl-phosphine-oxide, preferably trioctyl-phosphine-oxide (TOPO), and optionally at least one alkane and wherein the aliphatic alcohol is produced from a carbon source by contacting the carbon source with at least one microorganism capable of converting the carbon source to the aliphatic alcohol.

The microorganism may be
  (i) a mixture of a first and a second microorganism and
    the first microorganism is an acetogenic microorganism capable of converting the carbon source to acetate and/or ethanol; and
    the second microorganism is for carbon chain elongation and is selected from the group consisting of *Clostridium kluyveri*, and *C.Carboxidivorans* and is capable of converting the acetate and/or ethanol to form an acid; and
  wherein the first microorganism is further capable of converting the acid to the corresponding aliphatic alcohol, or
  (ii) *C.Carboxidivorans* capable of converting the carbon source to the aliphatic alcohol.

Preferably the alkane comprises at least 12 carbon atoms.

In particular, the extraction method according to any aspect of the present invention allows for an increase in yield relative to the amount of extractants used. For example, less than 50% by weight of extracting medium may be used to extract the same amount of aliphatic alcohols as if only pure alkanes were used. Therefore, with a small volume of extracting medium, a larger yield of aliphatic alcohols may be extracted. The extracting medium is also not harmful to microorganisms. Accordingly, the extracting medium according to any aspect of the present invention may be present when the aliphatic alcohol is biotechnologically produced. Further the aliphatic alcohols can be easily separated from the extracting medium according to any aspect of the present invention by distillation. After the separation, e.g. via distillation, the extracting medium may be easily recycled.

The method according to any aspect of the present invention may be a method of extracting at least one aliphatic alcohol from an aqueous medium. An isolated aliphatic alcohol may refer to at least one aliphatic alcohol that may be separated from the medium where the aliphatic alcohol has been produced. In one example, the aliphatic alcohol may be produced in an aqueous medium (e.g. fermentation medium where the aliphatic alcohol is produced by specific cells from a carbon source). The isolated aliphatic alcohol may refer to the aliphatic alcohol thereof extracted from the aqueous medium. In particular, the extracting step allows for the separation of excess water from the aqueous medium thus resulting in a formation of a mixture containing the extracted aliphatic alcohol.

The extracting medium may also be referred to as the 'extraction medium'. The extraction medium may be used for extracting/isolating the aliphatic alcohol produced according to any method of the present invention from the aqueous medium wherein the aliphatic alcohol was originally produced.

At the end of the extracted step, excess water from the aqueous medium may be removed thus resulting in the extracting medium containing the extracted aliphatic alcohol. The extracting medium may comprise a combination of compounds that may result in an efficient means of extracting the aliphatic alcohol from the aqueous medium. In particular, the extracting medium may comprise: (i) at least one alkane comprising at least 12 carbon atoms, and (ii) at least one trialkyl-phosphine-oxide. The extraction medium according to any aspect of the present invention may efficiently extract the aliphatic alcohol into the alkane-trialkyl-phosphine-oxide extracting medium. This extracting medium of a mixture of trialkyl-phosphine-oxide and at least one alkane may be considered suitable in the method according to any aspect of the present invention as the mixture works efficiently in extracting the desired aliphatic alcohol in the presence of a fermentation medium. In particular, the mixture of trialkyl-phosphine-oxide and at least one alkane may be considered to work better than any method currently known in the art for extraction of aliphatic alcohol as it does not require any special equipment to be carried out and it is relatively easy to perform with a high product yield.

The alkane may comprise at least 12 carbon atoms. In particular, the alkane may comprise 12-18 carbon atoms. In one example, the alkane may be selected from the group consisting of dodecane, tridecane, tetradecane, pentadecane, hexadecane, heptadecane and octadecane. In a further example, the extracting medium may comprise a mixture of alkanes. In another example, the alkane may be a branched alkane.

Trialkyl-phosphine-oxides have a general formula of $OPX_3$, where X is an alkyl. Suitable trialkyl-phosphine-oxides according to any aspect of the present invention include an alkyl group composed of a linear, branched or cyclic hydrocarbon, the hydrocarbon composed of from 1 to about 100 carbon atoms and from 1 to about 200 hydrogen atoms. In particular, "alkyl" as used in reference to trialkyl-phosphine-oxide according to any aspect of the present invention can refer to a hydrocarbon group having 1 to 20 carbon atoms, frequently between 4 and 15 carbon atoms, or between 6 and 12 carbon atoms, and which can be composed of straight chains, cyclics, branched chains, or mixtures of these. X can be the same or different alkyl-radicals within one molecule. If different alkyl-radicals are present in one trialkyl-phosphine-oxide molecule, the alkyl-radicals are preferably selected from C8 and C10. Typically, the trialkyl-phosphine-oxide is selected from the group consisting of tributyl-phosphine-oxide, trihexyl-phosphine-oxide, trioctyl-phosphine-oxide, tridecyl-phosphine-oxide and mixtures thereof.

Even more in particular, the trialkyl-phosphine-oxide may be trioctyl-phosphine oxide (TOPO). trioctyl-phosphine-oxide (TOPO) is an organophosphorus compound with the formula $OP(C_8H_{17})_3$. The at least one trialkyl-phosphine-oxide, preferably trioctyl-phosphine-oxide (TOPO), may be present in the extraction medium together with at least one alkane. In particular, the mixture of at least one trialkyl-phosphine-oxide, preferably trioctyl-phosphine-oxide (TOPO), and alkane comprising at least 12 carbon atoms may comprise about 1:100 to 1:10 weight ratio of at least one trialkyl-phosphine-oxide, preferably trioctyl-phosphine-oxide (TOPO), relative to the alkane. More in particular, the weight ratio of at least one trialkyl-phosphine-oxide, preferably trioctyl-phosphine-oxide (TOPO), to alkane in the extraction medium according to any aspect of the present invention may be about 1:100, 1:90, 1:80, 1:70, 1:60, 1:50, 1:40, 1:30, 1:25, 1:20, 1:15, or 1:10. Even more in particular, the weight ratio of at least one trialkyl-phosphine-oxide, preferably trioctyl-phosphine-oxide (TOPO), to alkane may be selected within the range of 1:90 to 1:10, 1:80 to 1:10, 1:70 to 1:10, 1:60 to 1:10, 1:50 to 1:10, 1:40 to 1:10, 1:30 to 1:10 or 1:20 to 1:10. The weight ratio of at least one trialkyl-phosphine-oxide, preferably trioctyl-phosphine-oxide (TOPO), to alkane may be between 1:40 to 1:15 or 1:25 to 1:15. In one example, the weight ratio of at least one trialkyl-phosphine-oxide, preferably trioctyl-phosphine-oxide (TOPO), to alkane may be about 1:15. In the example, the alkane may be hexadecane and therefore the weight ratio of at least one trialkyl-phosphine oxide, preferably trioctyl-phosphine-oxide (TOPO), to hexadecane may be about 1:15.

The term 'about' as used herein refers to a variation within 20 percent. In particular, the term "about" as used herein refers to +/−20%, more in particular, +/−10%, even more in particular, +/−5% of a given measurement or value.

In a preferred method according to the instant invention the extracting medium contains aside the phosphine oxide a second organic component. The second organic component contains at least 12 carbons. The second organic component is an alkane linear or branched that may be selected from the group consisting, tetradecane, pentadecane, hexadecane, heptadecane, and octadecane or mixtures of alkanes such as white mineral oil (Fragoltherm-Q-32-N). Furthermore the second organic component may comprise of an aromatic hydrocarbon that may be selected from the group consisting, diisopropylbiphenyl, partly hydrogenated terphenyl, dibenzyltoluol and diisopropylnaphthalene or a mix of aromatic solvents such as Solvesso 200. Another possibility is to use an alcohol that may be selected from the group consisting, oleyl alcohol, 2-octyldodecanol and 2-hexyldodecanol as the second organic component.

The extracting medium according to any aspect of the present invention may efficiently extract the aliphatic alcohol into the extracting medium. This extracting medium of a mixture of at least one alkyl-phosphine oxide containing at least two different alkyl radicals per alkyl-phosphine oxide molecule, and at least one alkane may be considered suitable in the method according to any aspect of the present invention as the mixture works efficiently in extracting the desired aliphatic alcohol in the presence of the aqueous production medium. The alkane may be a straight or a branched alkane.

In another example, the extracting medium of a mixture of at least one alkyl-phosphine oxide containing at least two different alkyl radicals per alkyl-phosphine oxide molecule and at least one partially hydrogenated aromatic hydrocarbon may be considered suitable in the method according to any aspect of the present invention as the mixture works efficiently in extracting the desired organic acid and/or alcohol in the presence of the aqueous production medium. In particular, the mixture of at least one alkyl-phosphine oxide containing at least two different alkyl radicals per alkyl-phosphine oxide molecule and at least one partially hydrogenated aromatic hydrocarbon may be considered to work better than any method currently known in the art for extraction of the aliphatic alcohol as it does not require any special equipment to be carried out and it is relatively easy to perform with a high product yield. Further, the extracting medium according to any aspect of the present invention in combination with alkane or partially hydrogenated aromatic solvent is also not toxic for microorganisms.

In step (a) according to any aspect of the present invention, the aliphatic alcohol in the aqueous medium may contact the extracting medium for a time sufficient to extract the aliphatic alcohol from the aqueous medium into the extracting medium. A skilled person may be capable of determining the amount of time needed to reach distribution equilibrium and the right bubble agglomeration that may be needed to optimize the extraction process. In some examples the time needed may be dependent on the amount of aliphatic alcohol that may be extracted. In particular, the time needed to extract the aliphatic alcohol from the aqueous medium into the extracting medium may only take a few minutes. In examples where the extraction is carried out as fermentation takes place, the time for extraction is equivalent to the time of fermentation.

The ratio of the extracting medium used to the amount of aliphatic alcohol to be extracted may vary depending on how quick the extraction is to be carried out. In one example, the amount of extracting medium is equal to the amount of aqueous medium comprising the aliphatic alcohol, After the step of contacting the extracting medium with the aqueous medium, the two phases (aqueous and organic) are separated using any means known in the art. In one example, the two phases may be separated using a separation funnel. The two phases may also be separated using mixer-settlers, pulsed columns, and the like. In one example, where the aliphatic alcohol is hexanol, the separation of the extracting medium from the hexanol may be carried out using distillation in view of the fact that hexanol distils at a significantly lower boiling point than the extracting medium. A skilled person may be able to select the best method of separating the extraction medium from the desired aliphatic alcohol in step (b) depending on the characteristics of the aliphatic alcohol desired to be extracted. In particular, step (b) according to any aspect of the present invention involves the recovering of the aliphatic alcohol from step (a).

Step (b) preferably ends with the organic absorbent made available again to be recycled or reused, preferably in step (0) (see below).

The aliphatic alcohol preferably is selected from the group consisting of aliphatic alcohol containing 2 to 16, preferably 5 to 12 carbon atoms. More in particular, the aliphatic alcohol may be selected from the group consisting of aliphatic alcohol with 4 to 16, 4 to 14, 4 to 12, 4 to 10, 5 to 16, 5 to 14, 5 to 12, 5 to 10, 6 to 16, 6 to 14, 6 to 12, or 6 to 10 carbon atoms. In particular, the aliphatic alcohol may be selected from the group consisting of pentanol, hexanol, heptanol and octanol. Even more in particular, the aliphatic alcohol may be selected from the group consisting of butanol and hexanol. In particular, the aliphatic alcohol is a hexanol.

In some examples, microorganisms capable of producing the aliphatic alcohol may be cultivated with any culture media, substrates, conditions, and processes generally known in the art for culturing bacteria. This allows for the aliphatic alcohol to be produced using a biotechnological method. Depending on the microorganism that is used for aliphatic alcohol production, appropriate growth medium, pH, temperature, agitation rate, inoculum level, and/or aerobic, microaerobic, or anaerobic conditions are varied. A skilled person would understand the other conditions necessary to carry out the method according to any aspect of the present invention. In particular, the conditions in the container (e.g. fermenter) may be varied depending on the microorganisms used. The varying of the conditions to be suitable for the optimal functioning of the microorganisms is within the knowledge of a skilled person.

In one example, the method according to any aspect of the present invention may be carried out in an aqueous medium with a pH between 5 and 8, or 5.5 and 7. The pressure may be between 1 and 10 bar. The microorganisms may be cultured at a temperature ranging from about 20° C. to about 80° C. In one example, the microorganism may be cultured at 37° C.

In some examples, for the growth of the microorganism and for its production of aliphatic alcohol, the aqueous medium may comprise any nutrients, ingredients, and/or supplements suitable for growing the microorganism or for promoting the production of the aliphatic alcohol. In particular, the aqueous medium may comprise at least one of the following: carbon sources, nitrogen sources, such as an ammonium salt, yeast extract, or peptone; minerals; salts; cofactors; buffering agents; vitamins; and any other components and/or extracts that may promote the growth of the bacteria. The culture medium to be used must be suitable for the requirements of the particular strains. Descriptions of culture media for various microorganisms are given in "Manual of Methods for General Bacteriology".

Accordingly, the method of extraction of an aliphatic alcohol according to any aspect of the present invention may be used together with any biotechnological method of producing the aliphatic alcohol. This is especially advantageous as usually during the fermentation process to produce aliphatic alcohol using biological methods, the aliphatic alcohol would be left to collect in the aqueous medium and after reaching certain concentrations in the fermentation medium, the very target product (aliphatic alcohols) may inhibit the activity and productivity of the microorganism. This thus limits the overall yield of the fermentation process. With the use of this extraction method, the aliphatic alcohols are extracted as they are produced thus reducing end-product inhibition drastically.

The method according to any aspect of the present invention is also more efficient and cost-effective than the traditional methods of removing aliphatic alcohols, particularly from a fermentation method as they are produced, as there is no primary reliance on distillation and/or a precipitation for recovering of aliphatic alcohols. Distillation or precipitation process may lead to higher manufacturing costs, lower yield, and higher waste products therefore reducing the overall efficiency of the process. The method according to any aspect of the present invention attempts to overcome these shortcomings.

In one example, the aliphatic alcohol is hexanol. In this example, the hexanol may be produced from at least one carbon source, for example, synthesis gas.

The synthesis gas may be converted to hexanol in the presence of at least one acetogenic bacteria and/or hydrogen oxidising bacteria. In particular, any method known in the art may be used. Hexanol may be produced from synthesis gas by at least one prokaryote. In particular, the prokaryote may be selected from the group consisting of the genus *Escherichia* such as *Escherichia coli*; from the genus *Clostridia* such as *Clostridium ljungdahlii, Clostridium autoethanogenum, Clostridium carboxidivorans* or *Clostridium kluyveri*; from the genus *Corynebacteria* such as *Corynebacterium glutamicum*; from the genus *Cupriavidus* such as *Cupriavidus necator* or *Cupriavidus metallidurans*; from the genus *Pseudomonas* such as *Pseudomonas fluorescens, Pseudomonas putida* or *Pseudomonas oleavorans*; from the genus *Delftia* such as *Delftia acidovorans*; from the genus *Bacillus* such as *Bacillus subtillis*; from the genus *Lactobacillus* such as *Lactobacillus delbrueckii*; or from the genus *Lactococcus* such as *Lactococcus lactis*.

In another example, hexanol may be produced from a carbon source, for example synthesis gas by at least one eukaryote. The eukaryote used in the method of the present invention may be selected from the genus *Aspergillus* such as *Aspergillus niger*; from the genus *Saccharomyces* such as *Saccharomyces cerevisiae*; from the genus *Pichia* such as *Pichia pastoris*; from the genus *Yarrowia* such as *Yarrowia lipolytica*; from the genus *Issatchenkia* such as *Issathenkia orientalis; from the genus Debaryomyces* such as *Debaryomyces hansenii*; from the genus *Arxula* such as *Arxula adenoinivorans*; or from the genus *Kluyveromyces* such as *Kluyveromyces lactis*.

The term "acetogenic bacteria" as used herein refers to a microorganism which is able to perform the Wood-Ljungdahl pathway and thus is able to convert CO, $CO_2$ and/or hydrogen to acetate. These microorganisms include microorganisms which in their wild-type form do not have a Wood-Ljungdahl pathway, but have acquired this trait as a result of genetic modification. Such microorganisms include but are not limited to *E. coli* cells. These microorganisms may be also known as carboxydotrophic bacteria. Currently, 21 different genera of the acetogenic bacteria are known in the art (Drake et al., 2006), and these may also include some clostridia (Drake & Kusel, 2005). These bacteria are able to use carbon dioxide or carbon monoxide as a carbon source with hydrogen as an energy source (Wood, 1991). Further, alcohols, aldehydes, carboxylic acids as well as numerous hexoses may also be used as a carbon source (Drake et al., 2004). The reductive pathway that leads to the formation of acetate is referred to as acetyl-CoA or Wood-Ljungdahl pathway. In particular, the acetogenic bacteria may be selected from the group consisting of *Acetoanaerobium notera* (ATCC 35199), *Acetonema longum* (DSM 6540), *Acetobacterium carbinolicum* (DSM 2925), *Acetobacterium malicum* (DSM 4132), *Acetobacterium species no.* 446 (Morinaga et al., 1990, *J. Biotechnol.*, Vol. 14, p. 187-194), *Acetobacterium wieringae* (DSM 1911), *Acetobacterium woodii* (DSM 1030), *Alkalibaculum bacchi* (DSM 22112), *Archaeoglobus fulgidus* (DSM 4304), *Blautia producta* (DSM 2950, formerly *Ruminococcus productus*, formerly *Peptostreptococcus productus*), *Butyribacterium methylotrophicum* (DSM 3468), *Clostridium aceticum* (DSM 1496), *Clostridium autoethanogenum* (DSM 10061, DSM 19630 and DSM 23693), *Clostridium carboxidivorans* (DSM 15243), *Clostridium coskatii* (ATCC no. PTA-10522), *Clostridium drakei* (ATCC BA-623), *Clostridium formicoaceticum* (DSM 92), *Clostridium glycolicum* (DSM 1288), *Clostridium ljungdahlii* (DSM 13528), *Clostridium ljungdahlii* C-01 (ATCC 55988), *Clostridium ljungdahlii* ERI-2 (ATCC 55380), *Clostridium ljungdahlii* O-52 (ATCC 55989), *Clostridium mayombei* (DSM 6539), *Clostridium methoxybenzovorans* (DSM 12182), *Clostridium ragsdalei* (DSM 15248), *Clostridium scatologenes* (DSM 757), *Clostridium species* ATCC 29797 (Schmidt et al., 1986, *Chem. Eng. Commun.*, Vol. 45, p. 61-73), *Desulfotomaculum kuznetsovii* (DSM 6115), *Desulfotomaculum thermobezoicum subsp. thermosyntrophicum* (DSM 14055), *Eubacterium limosum* (DSM 20543), *Methanosarcina acetivorans* C2A (DSM 2834), *Moorella sp.* HUC22-1 (Sakai et al., 2004, *Biotechnol. Let.*, Vol. 29, p. 1607-1612), *Moorella thermoacetica* (DSM 521, formerly *Clostridium thermoaceticum*), *Moorella thermoautotrophica* (DSM 1974), *Oxobacter pfennigii* (DSM 322), *Sporomusa aerivorans* (DSM 13326), *Sporomusa ovata* (DSM 2662), *Sporomusa silvacetica* (DSM 10669), *Sporomusa sphaeroides* (DSM 2875), *Sporomusa termitida* (DSM 4440) and *Thermoanaerobacter kivui* (DSM 2030, formerly *Acetogenium kiviu*).

More in particular, the strain ATCC BAA-624 of *Clostridium carboxidivorans* may be used. Even more in particular, the bacterial strain labelled "P7" and "P11" of *Clostridium carboxidivorans* as described for example in U.S. 2007/0275447 and U.S. 2008/0057554 may be used.

The production of hexanol in *Clostridium carboxidivorans* from syngas containing $CO_2$ is especially taught in Naveira et al., Journal of Chemical Technology & Biotechnology 92(4), April 2017.

Another particularly suitable bacterium may be *Clostridium ljungdahlii*. In particular, strains selected from the group consisting of *Clostridium ljungdahlii* PETC, *Clostridium ljungdahlii* ERI2, *Clostridium ljungdahlii* COL and *Clostridium ljungdahlii* O-52 may be used in the conversion of synthesis gas to hexanol. These strains for example are described in WO 98/00558, WO 00/68407, ATCC 49587, ATCC 55988 and ATCC 55989.

The acetogenic bacteria may be used in conjunction with a hydrogen oxidising bacteria. In one example, both an acetogenic bacteria and a hydrogen oxidising bacteria may be used to produce hexanol from a carbon source, for example synthesis gas. In another example, only acetogenic bacteria may be used for metabolising synthesis gas to produce hexanol from a carbon source, for example synthesis gas. In yet another example, only a hydrogen oxidising bacteria may be used in this reaction.

The hydrogen oxidising bacteria may be selected from the group consisting of *Achromobacter, Acidithiobacillus, Acidovorax, Alcaligenes, Anabena, Aquifex, Arthrobacter, Azospirillum, Bacillus, Bradyrhizobium, Cupriavidus, Derxia, Helicobacter, Herbaspirillum, Hydrogenobacter, Hydrogenobaculum, Hydrogenophaga, Hydrogenophilus, Hydrogenothermus, Hydrogenovibrio, Ideonella sp. O1, Kyrpidia, Metallosphaera, Methanobrevibacter, Myobacterium, Nocardia, Oligotropha, Paracoccus, Pelomonas, Polaromonas, Pseudomonas, Pseudonocardia, Rhizobium, Rhodococcus, Rhodopseudomonas, Rhodospirillum, Streptomyces, Thiocapsa, Treponema, Variovorax, Xanthobacter* and *Wautersia*.

In the production of hexanol from a carbon source, for example synthesis gas a combination of bacteria may be used. There may be more than one acetogenic bacteria present in combination with one or more hydrogen oxidising bacteria. In another example, there may be more than one type of acetogenic bacteria present only. In yet another example, there may more than one hydrogen oxidising bacteria present only. Hexanoic acid also known as caproic acid has general formula $C_5H_{11}COOH$.

In particular, the hexanoic producing method may comprise the step of:
  contacting a carbon source, for example synthesis gas with at least one bacteria capable of carrying out the Wood-Ljungdahl pathway and chain elongation to produce hexanol.

In particular, the microorganism may be
  (i) a mixture of a first and a second microorganism and the first microorganism is an acetogenic microorganism capable of converting the carbon source to acetate and/or ethanol; and
    the second microorganism is for carbon chain elongation and is selected from the group consisting of *Clostridium kluyveri*, and *C.Carboxidivorans* and is capable of converting the acetate and/or ethanol to form an acid; and
  wherein the first microorganism is further capable of converting the acid to the corresponding aliphatic alcohol, or
  (ii) *C.Carboxidivorans* capable of converting the carbon source to the aliphatic alcohol.

The term "contacting", as used herein, means bringing about direct contact between the aliphatic alcohol in the medium with the extraction medium in step (a) and/or the direct contact between the microorganism and a carbon source, for example synthesis gas. For example, the cell, and the medium comprising the carbon source may be in different compartments. In particular, the carbon source may be in a gaseous state and added to the medium comprising the cells according to any aspect of the present invention.

In one example, the production of hexanol from a carbon source, for example synthesis gas may involve the use of the acetogenic bacteria in conjunction with a bacterium capable of producing the hexanol using bacteria capable of chain elongation. In one example, both an acetogenic bacteria and a bacteria capable of chain elongation may be used to produce hexanol from a carbon source, for example synthesis gas. For example, *Clostridium ljungdahlii* may be used simultaneously with *Clostridium kluyveri*. In another example, only acetogenic bacteria may be used for metabolising a carbon source, for example synthesis gas to produce hexanol from a carbon source, for example, synthesis gas. In this example, the acetogenic bacteria may be capable of carrying out both the chain elongation and the Wood-Ljungdahl pathway. In one example, the acetogenic bacteria may be *C. carboxidivorans* which may be capable of carrying out both the Wood-Ljungdahl pathway and the chain elongation.

The organism that is capable of carrying out chain elongation may be selected from the group consisting of *Clostridium kluyveri, C.Carboxidivorans* and the like. These microorganisms include microorganisms which in their wild-type form do not have the ability to carry out chain elongation, but have acquired this trait as a result of genetic modification. In particular, the microorganism may be *Clostridium kluyveri*.

In one example, the bacteria used according to any aspect of the present invention is selected from the group consisting of *Clostridium kluyveri* and *C.Carboxidivorans*.

In particular, the cells are brought into contact with a carbon source which includes monosaccharides (such as glucose, galactose, fructose, xylose, arabinose, or xylulose), disaccharides (such as lactose or sucrose), oligosaccharides, and polysaccharides (such as starch or cellulose), one-carbon substrates and/or mixtures thereof. More in particular, the cells are brought into contact with a carbon source comprising CO and/or $CO_2$ to produce an aliphatic alcohol.

With respect to the source of substrates comprising carbon dioxide and/or carbon monoxide, a skilled person would understand that many possible sources for the provision of CO and/or $CO_2$ as a carbon source exist. It can be seen that in practice, as the carbon source of the present invention any gas or any gas mixture can be used which is able to supply the microorganisms with sufficient amounts of carbon, so that acetate and/or ethanol, may be formed from the source of CO and/or $CO_2$.

Generally for the cell of the present invention the carbon source comprises at least 50% by weight, at least 70% by weight, particularly at least 90% by weight of $CO_2$ and/or CO, wherein the percentages by weight-% relate to all carbon sources that are available to the cell according to any aspect of the present invention. The carbon material source may be provided.

Examples of carbon sources in gas forms include exhaust gases such as synthesis gas, flue gas and petroleum refinery gases produced by yeast fermentation or clostridial fermentation. These exhaust gases are formed from the gasification of cellulose-containing materials or coal gasification. In one example, these exhaust gases may not necessarily be produced as by-products of other processes but can specifically be produced for use with the mixed culture of the present invention.

According to any aspect of the present invention, the carbon source, also for the production of acetate and/or ethanol used in step (a) (see below) according to any aspect of the present invention may be synthesis gas. Synthesis gas can for example be produced as a by-product of coal gasification. Accordingly, the microorganism according to any aspect of the present invention may be capable of converting a substance which is a waste product into a valuable resource.

In another example, synthesis gas may be a by-product of gasification of widely available, low-cost agricultural raw materials for use with the mixed culture of the present invention to produce substituted and unsubstituted organic compounds.

There are numerous examples of raw materials that can be converted into synthesis gas, as almost all forms of vegetation can be used for this purpose. In particular, raw materials are selected from the group consisting of perennial grasses such as miscanthus, corn residues, processing waste such as sawdust and the like.

In general, synthesis gas may be obtained in a gasification apparatus of dried biomass, mainly through pyrolysis, partial oxidation and steam reforming, wherein the primary products of the synthesis gas are CO, $H_2$ and $CO_2$. Syngas may also be a product of electrolysis of $CO_2$. A skilled person would understand the suitable conditions to carry out electrolysis of $CO_2$ to produce syngas comprising CO in a desired amount.

Usually, a portion of the synthesis gas obtained from the gasification process is first processed in order to optimize product yields, and to avoid formation of tar. Cracking of the undesired tar and CO in the synthesis gas may be carried out using lime and/or dolomite. These processes are described in detail in for example, Reed, 1981.

The overall efficiency, aliphatic alcohol productivity and/or overall carbon capture of the method of the present invention may be dependent on the stoichiometry of the $CO_2$, CO, and $H_2$ in the continuous gas flow. The continuous gas flows applied may be of composition $CO_2$ and $H_2$. In particular, in the continuous gas flow, concentration range of $CO_2$ may be about 10-50%, in particular 3% by weight and $H_2$ would be within 44% to 84%, in particular, 64 to 66.04% by weight. In another example, the continuous gas flow can also comprise inert gases like $N_2$, up to a $N_2$ concentration of 50% by weight.

Mixtures of sources can be used as a carbon source.

According to any aspect of the present invention, a reducing agent, for example hydrogen may be supplied together with the carbon source. In particular, this hydrogen may be supplied when the C and/or $CO_2$ is supplied and/or used. In one example, the hydrogen gas is part of the synthesis gas present according to any aspect of the present invention. In another example, where the hydrogen gas in the synthesis gas is insufficient for the method of the present invention, additional hydrogen gas may be supplied. In one example, hydrogen may be a product of electrolysis of water.

In one example, the aliphatic alcohol is hexanol. More in particular, the carbon source comprising CO and/or $CO_2$ contacts the cells in a continuous gas flow. Even more in particular, the continuous gas flow comprises synthesis gas. These gases may be supplied for example using nozzles that open up into the aqueous medium, frits, membranes within the pipe supplying the gas into the aqueous medium and the like.

A skilled person would understand that it may be necessary to monitor the composition and flow rates of the streams at relevant intervals. Control of the composition of the stream can be achieved by varying the proportions of the constituent streams to achieve a target or desirable composition. The composition and flow rate of the blended stream can be monitored by any means known in the art. In one example, the system is adapted to continuously monitor the flow rates and compositions of at least two streams and combine them to produce a single blended substrate stream in a continuous gas flow of optimal composition and means for passing the optimised substrate stream to the fermenter.

The term "an aqueous solution" or "medium" comprises any solution comprising water, mainly water as solvent that may be used to keep the cell according to any aspect of the present invention, at least temporarily, in a metabolically active and/or viable state and comprises, if such is necessary, any additional substrates. The person skilled in the art is familiar with the preparation of numerous aqueous solutions, usually referred to as media that may be used to keep and/or culture the cells, for example LB medium in the case of *E. coli*, ATCC1754-Medium may be used in the case of *C. ljungdahlii*. It is advantageous to use as an aqueous solution a minimal medium, i.e. a medium of reasonably simple composition that comprises only the minimal set of salts and nutrients indispensable for keeping the cell in a metabolically active and/or viable state, by contrast to complex mediums, to avoid dispensable contamination of the products with unwanted side products. For example, M9 medium may be used as a minimal medium. The cells are incubated with the carbon source sufficiently long enough to produce the desired product. For example for at least 1, 2, 4, 5, 10 or 20 hours. The temperature chosen must be such that the cells according to any aspect of the present invention remains catalytically competent and/or metabolically active, for example 10 to 42° C., preferably 30 to 40° C., in particular, 32 to 38° C. in case the cell is a *C. ljungdahlli* cell. The aqueous medium according to any aspect of the present invention also includes the medium in which the aliphatic alcohol is produced. It mainly refers to a medium where the solution comprises substantially water. In one example, the aqueous medium in which the cells are used to produce the aliphatic alcohol is the very medium which contacts the extraction medium for extraction of the aliphatic alcohol.

In particular, the mixture of the microorganism and the carbon source according to any aspect of the present invention may be employed in any known bioreactor or fermenter to carry out any aspect of the present invention. In one example, the complete method according to any aspect of the present invention that begins with the production of the aliphatic alcohol and ends with the extraction of the aliphatic alcohol takes place in a single container. There may therefore be no separation step between the step of producing aliphatic alcohol and the step of extracting the aliphatic alcohol. This saves time and costs. In particular, during the fermentation process, the microorganism may be grown in the aqueous medium and in the presence of the extraction medium. The method according to any aspect of the present invention thus provides for a one pot means of producing aliphatic alcohols. Also, since the aliphatic alcohol is being extracted as it is produced, no end-product inhibition takes place, ensuring that the yield of aliphatic alcohol is maintained. A further step of separation may be carried out to remove the aliphatic alcohol. Any separation method known in the art such as using a funnel, column, distillation and the like may be used. The remaining extracting medium and/or the cells may then be recycled.

In another example, the extraction process may take place as a separate step and/or in another pot. After fermentation has taken place, where the desired aliphatic alcohol to be extracted has already been produced, the extracting medium according to any aspect of the present invention may be added to the fermentation medium or the fermentation medium may be added to a pot comprising the extracting medium. The desired aliphatic alcohol may then be extracted by any separation method known in the art such as using a funnel, column, distillation and the like. The remaining extracting medium may then be recycled.

Another advantage of the method is that the extracting medium may be recycled. Therefore, once the aliphatic alcohol is separated from extraction medium, the extraction medium can be recycled and reused, reducing waste.

According to another aspect of the present invention, there is provided a use of at least one trialkyl-phosphine-oxide, preferably trioctyl-phosphine-oxide (TOPO), and optionally at least one alkane for extracting an aliphatic alcohol from an aqueous medium wherein the alkane preferably comprises at least 12 carbon atoms. In particular, the alkane may comprise 12 to 18 carbon atoms. More in particular, the alkane may be hexadecane. Even more in particular, the aliphatic alcohol is selected from the group consisting of aliphatic alcohols with 5 to 16 carbon atoms. In one example, the aliphatic alcohol may be hexanol.

In a preferred method according to the instant invention ethanol and/or acetate is used as a starting material.

This preferred method according to the instant invention extracts the aliphatic alcohol produced from ethanol and/or acetate comprises step (0) before step (a):

(0) contacting the ethanol and/or acetate with at least one microorganism capable of carrying out carbon chain elongation in the aqueous medium to produce the aliphatic alcohol from the ethanol and/or acetate.

According to a preferred method according to the instant invention the aqueous medium after step (b) of separating the aliphatic alcohol, may be recycled back into step (0). This step of recycling allows for the microorganisms to be recycled and reused as the extracting medium according to the present invention is not toxic to the microorganisms. This step of recycling the aqueous medium in the method according to the present invention has the further advantage of enabling the residue of the aliphatic alcohol, which was not at first instance extracted from steps (a) and (b) in the first cycle, to be given a chance to be extracted a further time or as many times as the aqueous medium is recycled.

The microorganism in (0) capable of carrying out carbon chain elongation to produce the aliphatic alcohol may be any organism that may be capable of carbon-chain elongation (compare Jeon et al. Biotechnol Biofuels (2016) 9:129). The carbon chain elongation pathway is also disclosed in Seedorf, H., et al., 2008. The microorganisms according to any aspect of the present invention may also include microorganisms which in their wild-type form are not capable of carbon chain elongation, but have acquired this trait as a result of genetic modification. In particular, the microorganism in (0) may be selected from the group consisting of *Clostridium carboxidivorans, Clostridium kluyveri* and *C.pharus*. In particular, the microorganism according to any aspect of the present invention may be *Clostridium kluyveri*.

In step (0) according to any aspect of the present invention, ethanol and/or acetate is contacted with at least one microorganism capable of carrying out carbon chain elongation to produce the aliphatic alcohol from the ethanol and/or acetate. In one example, the carbon source may be ethanol in combination with at least one other carbon source selected from the group consisting of acetate, propionate, butyrate, isobutyrate, valerate and hexanoate. In particular, the carbon source may be ethanol and acetate. In another example, the carbon source may be a combination of propionic acid and ethanol, acetate and ethanol, isobutyric acid and ethanol or butyric acid and ethanol. In one example, the carbon substrate may be ethanol alone. In another example, the carbon substrate may be acetate alone.

The source of acetate and/or ethanol may vary depending on availability. In one example, the ethanol and/or acetate may be the product of fermentation of synthesis gas or any carbohydrate known in the art. In particular, the carbon source for acetate and/or ethanol production may be selected from the group consisting of alcohols, aldehydes, glucose, sucrose, fructose, dextrose, lactose, xylose, pentose, polyol, hexose, ethanol and synthesis gas. Mixtures of sources can be used as a carbon source.

Even more in particular, the carbon source may be synthesis gas. The synthesis gas may be converted to ethanol and/or acetate in the presence of at least one acetogenic bacteria.

In one example, the production of the aliphatic alcohol is from acetate and/or ethanol which is from synthesis gas and may involve the use of the acetogenic bacteria in conjunction with a microorganism capable of carbon chain elongation. For example, *Clostridium ljungdahlii* may be used simultaneously with *Clostridium kluyveri*. In another example, a single acetogenic cell may be capable of the activity of both organisms. For example, the acetogenic bacteria may be *C. carboxidivorans* which may be capable of carrying out both the Wood-Ljungdahl pathway and the carbon chain elongation pathway.

The ethanol and/or acetate used in step (a) according to any aspect of the present invention may be a product of fermentation of a carbon source, for example synthesis gas or may be obtained through other means. The ethanol and/or acetate may then be brought into contact with the microorganism in step (a).

The term "contacting", as used herein, means bringing about direct contact between the microorganism and the ethanol and/or acetate. In one example, ethanol is the carbon source and the contacting in step (a) involves contacting the ethanol with the microorganism of step (a). The contact may be a direct contact or an indirect one that may include a membrane or the like separating the cells from the ethanol or where the cells and the ethanol may be kept in two different compartments etc. For example, in step (a) the aliphatic alcohol, and the extracting medium, may be in different compartments.

According to any aspect of the present invention, where the extraction is carried out in step (a) as fermentation takes place in step (0), the time for extraction may be equivalent to the time of fermentation.

EXAMPLES

The foregoing describes preferred embodiments, which, as will be understood by those skilled in the art, may be subject to variations or modifications in design, construction or operation without departing from the scope of the claims. These variations, for instance, are intended to be covered by the scope of the claims.

Example 1

General description of extraction of hexanol:

A solution of hexanol (4 g/Kg) in distilled water was prepared. An ammonium acetate buffer (ammonium acetate 0.6 g/Kg adjusted to pH 5.8 by addition of acetic acid) was added to the solution to keep the pH close to 5.8 during extraction. The aqueous solution was placed in a separation funnel and vigorously mixed with an organic mixture of a trialkylphosphine (TAPO) in alkane or pure trialkylphosphine. The mass ratio of aqueous phase to organic phase was 9 to 1. After intense mixing the phases were allowed to separate and individually analysed by HPLC or $^1$H-NMR to determine the concentration of hexanol in each phase. The distribution of hexanol is indicated by the distribution constant Kd, whereat Kd is the ratio of the concentration in the organic phase divided by the concentration in the aqueous phase.

Results of hexanol extraction with buffer in aqueous phase:

| Entry | Added TAPO type* | Equilibrium pH | Aq. Hexanol conc. [g/Kg] (before/after) | Org. Hexanol conc. [g/kg] | Kd** hexanol |
|---|---|---|---|---|---|
| 1 | none (100% tetradecane) | 5.77 | 4.15/2.75 | 12.44 | 4.5 |
| 2 | C8/C10 (6% in tetradecane) | 5.77 | 4.15/1.40 | 24.42 | 17 |
| 3 | C8/C10 | 5.77 | 4.15/0.19 | 36.33 | 190 |

*Carbon number indicates the length of the alkyl chain. If two carbon numbers are shown, the corresponding trialkylphosphine exhibits both chain length in a statistic distribution.
**Kd is the ratio of the concentration in the organic phase divided by the concentration in the aqueous phase.

Results of hexanol extraction without buffer in aqueous phase:

| Entry | Added TAPO type* | Equilibrium pH | Aq. Hexanoic acid conc. [g/Kg] (before/after) | Org. Hexanol conc. [g/kg] | Kd** hexanol |
|---|---|---|---|---|---|
| 1 | none (100% tetradecane) | 7.01 | 3.70/2.40 | 11.65 | 4.9 |
| 2 | C8/C10 (6% in tetradecane) | 6.83 | 3.70/1.25 | 22.47 | 18 |
| 3 | C8/C10 | 8.23 | 3.70/0.17 | 30.48 | 180 |

*Carbon number indicates the length of the alkyl chain. If two carbon numbers are shown, the corresponding trialkylphosphine exhibits both chain length in a statistic distribution.
**Kd is the ratio of the concentration in the organic phase divided by the concentration in the aqueous phase.

As can be seen by the tables above, the trialkylphosphine can be applied over a broad pH range.

The invention claimed is:

1. A method of extracting an aliphatic alcohol containing 5 to 16 carbon atoms, from an aqueous medium, the method comprising:
   (a) contacting the aliphatic alcohol in the aqueous medium with at least one extracting medium for a time sufficient to extract the aliphatic alcohol from the aqueous medium into the extracting medium;
   (b) separating the extracting medium with the extracted aliphatic alcohol from the aqueous medium;
   wherein:
   the extracting medium comprises at least one trialkyl-phosphine-oxide and at least one alkane comprising 12 to 18 carbon atoms and wherein the weight ratio of the trialkyl-phosphine-oxide to alkane is between 1:100 to 1:10;
   the aqueous medium is a fermentation medium in which the aliphatic alcohol is produced from a carbon source by contacting the carbon source with one or more microorganisms; and
   after step b), the fermentation medium is recycled to step a).

2. The method of claim 1, wherein the aqueous medium comprises:
   (i) a mixture of a first and a second microorganism; wherein:
   the first microorganism is an acetogenic microorganism capable of converting the carbon source to acetate and/or ethanol; and the second microorganism is for carbon chain elongation, is selected from the group consisting of: *Clostridium kluyveri* and *C. Carboxidivorans*, and is capable of converting the acetate and/or ethanol to form an acid; and wherein the first microorganism is further capable of converting the acid to the corresponding aliphatic alcohol; or (ii) *C. Carboxidivorans* is capable of converting the carbon source to the aliphatic alcohol.

3. The method of claim 1, wherein the alkane is branched.

4. The method of claim 1, wherein the alkane is hexadecane.

5. The method of claim 1, wherein the aliphatic alcohol is a hexanol.

6. The method of claim 1, wherein the pH of the aqueous medium is maintained between 5.5 and 7.

7. The method of claim 1, wherein the trialkyl-phosphine-oxide is tri-octyl-phosphine oxide.

8. The method of claim 2, wherein the alkane is branched.

9. The method of claim 2, wherein the alkane is hexadecane.

10. The method of claim 2, wherein the aliphatic alcohol is a hexanol.

11. The method of claim 2, wherein the pH of the aqueous medium is maintained between 5.5 and 7.

12. The method of claim 2, wherein the trialkyl-phosphine-oxide is tri-octyl-phosphine oxide.

13. The method of claim 4, wherein the trialkyl-phosphine-oxide is tri-octyl-phosphine oxide.

14. The method of claim 5, wherein the aliphatic alcohol is a hexanol.

* * * * *